US010699186B2

(12) United States Patent
Craddock et al.

(10) Patent No.: US 10,699,186 B2
(45) Date of Patent: Jun. 30, 2020

(54) DETERMINING ORDERS OF EXECUTION OF A NEURAL NETWORK

(71) Applicant: Google Inc., Mountain View, CA (US)

(72) Inventors: Warren Craddock, San Francisco, CA (US); Fabien Viger, Paris (FR)

(73) Assignee: Google LLC, Moutain View, CA (US)

(*) Notice: Subject to any disclaimer, the term of this patent is extended or adjusted under 35 U.S.C. 154(b) by 1245 days.

(21) Appl. No.: 14/956,699

(22) Filed: Dec. 2, 2015

(65) Prior Publication Data

US 2017/0161604 A1 Jun. 8, 2017

(51) Int. Cl.
*G06N 3/063* (2006.01)
*G06N 3/04* (2006.01)

(52) U.S. Cl.
CPC ........... *G06N 3/063* (2013.01); *G06N 3/0454* (2013.01)

(58) Field of Classification Search
None
See application file for complete search history.

(56) References Cited

U.S. PATENT DOCUMENTS

| 4,920,487 | A | 4/1990 | Baffes |
| 5,704,012 | A | 12/1997 | Bigus |
| 5,747,652 | A | 4/1998 | Bigus |
| 5,819,245 | A | 10/1998 | Peterson et al. |
| 6,892,284 | B2 | 5/2005 | Ling et al. |
| 7,032,013 | B2 | 4/2006 | Ward et al. |
| 7,076,537 | B2 | 7/2006 | Ward et al. |
| 7,719,533 | B2 | 5/2010 | Nagaraj et al. |
| 7,895,261 | B2 | 2/2011 | Jones et al. |
| 7,937,346 | B2 | 5/2011 | Kato et al. |
| 8,225,074 | B2 | 7/2012 | Chakradhar et al. |
| 8,391,306 | B2 | 3/2013 | Ito et al. |
| 8,442,927 | B2 | 5/2013 | Chakradhar et al. |
| 8,626,700 | B1 | 1/2014 | Monraz et al. |
| 8,725,658 | B2 | 5/2014 | Izhikevich et al. |
| 8,898,093 | B1 | 11/2014 | Helmsen |

(Continued)

FOREIGN PATENT DOCUMENTS

CN 101809597 8/2010

OTHER PUBLICATIONS

Abadi et al., "TensorFlow: Large-Scale Machine Learning on Heterogeneous Systems", Preliminary White Paper, http://tensorflow.org, Nov. 9, 2015, 19 pages.

(Continued)

*Primary Examiner* — Kamran Afshar
*Assistant Examiner* — Benjamin J Buss
(74) *Attorney, Agent, or Firm* — Dority & Manning, P.A.

(57) ABSTRACT

Systems and methods are provided for determining an order of execution of a neural network. For instance, data indicative of a neural network and data indicative of an amount of available memory in a constrained memory space can be obtained. The neural network can include a plurality of operators. An order of execution associated with the neural network can then be determined. The order of execution specifies an order in which to execute each of the plurality of operators. The order of execution is determined based at least in part on the available memory in the constrained memory space. In particular, one or more graph search algorithms can be performed on a graph that is representative of the neural network to obtain the order of execution.

19 Claims, 6 Drawing Sheets

(56) References Cited

U.S. PATENT DOCUMENTS

| | | |
|---|---|---|
| 8,965,819 B2 | 2/2015 | Tirunagari |
| 2003/0144822 A1 | 7/2003 | Peh et al. |
| 2005/0166179 A1* | 7/2005 | Vronay .................. G06Q 10/00 717/105 |
| 2006/0167654 A1* | 7/2006 | Keinan .................. G06Q 10/04 702/181 |
| 2009/0119668 A1 | 5/2009 | Foley et al. |
| 2009/0158013 A1 | 6/2009 | Muff et al. |
| 2010/0049564 A1 | 2/2010 | Lewis et al. |
| 2010/0088490 A1* | 4/2010 | Chakradhar .............. G06F 8/45 712/34 |
| 2010/0214936 A1 | 8/2010 | Ito et al. |
| 2011/0219221 A1 | 9/2011 | Skadron et al. |
| 2012/0204014 A1 | 8/2012 | Leather et al. |
| 2014/0181477 A1 | 6/2014 | Vaidya et al. |

OTHER PUBLICATIONS

International Search Report for PCT/US2016/064067 dated Mar. 1, 2017, 12 pages.

\* cited by examiner

DETERMINING ORDERS OF EXECUTION OF A NEURAL NETWORK

FIELD

The present disclosure relates to execution of neural networks, and more particularly to determining an order of execution of a neural network for use in a constrained memory space.

BACKGROUND

In recent years, computer vision and other machine learning applications have become increasingly popular. For instance, such applications are being implemented in an increasingly large number of settings and environments. As such applications have grown in popularity, so too have they grown in complexity. In this manner, computer vision applications implemented on mobile devices having limited memory resources may be constrained by such limited memory resources.

In such limited memory settings, memory allocation and memory efficiency can become very important. For instance, it can be advantageous to limit an amount of memory required for execution of a computer vision and/or other machine learning application by a mobile device.

As one example, in certain constrained memory environments, a failure to properly allocate the constrained memory during execution of a neural network can be catastrophic and can, for example, require a complete reboot of the device executing the neural network. Stated differently, if the memory required for execution of the neural network exceeds the maximum availability of the memory (e.g., exceeds the constraints), then certain data may be lost or otherwise unable to be stored, causing execution of the neural network to fail.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining an order of execution of a neural network. The method includes obtaining, by one or more computing devices, data that describes a graph of a neural network. The neural network comprises a plurality of operators. The method further includes obtaining, by the one or more computing devices, data indicative of an amount of available memory in a constrained memory space. The method further includes performing, by the one or more computing devices, at least one graph search algorithm on the graph to determine an order of execution associated with the neural network. The order of execution specifies an order in which to execute each of the plurality of operators. The order of execution results in a memory usage that does not exceed the amount of available memory in the constrained memory space.

Another example aspect of the present disclosure is directed to a computing system to transform dynamically allocated execution of a neural network into statically allocated execution. The computing system includes at least one processor and at least one non-transitory computer-readable medium storing instructions executable by the at least one processor. Execution of the instructions causes the computing system to obtain data that describes a graph of a neural network. The neural network comprises a plurality of operators. Execution of the instructions causes the computing system to obtain data that describes an amount of available memory in a constrained memory space. Execution of the instructions causes the computing system to perform at least one graph search algorithm on the graph to determine an execution order for the plurality of operators of the neural network that results in memory usage that does not exceed the amount of available memory in the constrained memory space. Execution of the instructions causes the computing system to store the determined execution order, wherein future execution of the neural network occurs according to the stored execution order.

Another example aspect of the present disclosure is directed to non-transitory computer-readable medium storing instructions. When executed by at least one processor, the instructions cause the at least one processor to perform operations. The operations include obtaining data indicative of a neural network. The neural network includes a plurality of operators. The instructions further include obtaining data indicative of an amount of available memory in a constrained memory space. The instructions further include building a graph that describes a plurality of dependencies respectively between the plurality of operators of the neural network. The instructions further include performing at least one graph search algorithm to determine an order of execution for the neural network. The order of execution specifies an order in which to execute each of the plurality of operators. The order of execution is determined based at least in part on the available memory in the constrained memory space. Performing at least one graph search algorithm includes identifying one or more forced transitions within the graph that necessarily decrease one or more memory requirements of the order of execution, and pruning a search of a portion of the graph based at least in part on the identified one or more forced transitions.

Other example aspects of the present disclosure are directed to systems, apparatus, tangible, non-transitory computer-readable media, user interfaces, memory devices, and electronic devices for determining orders of execution for a search graph associated with a neural network.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
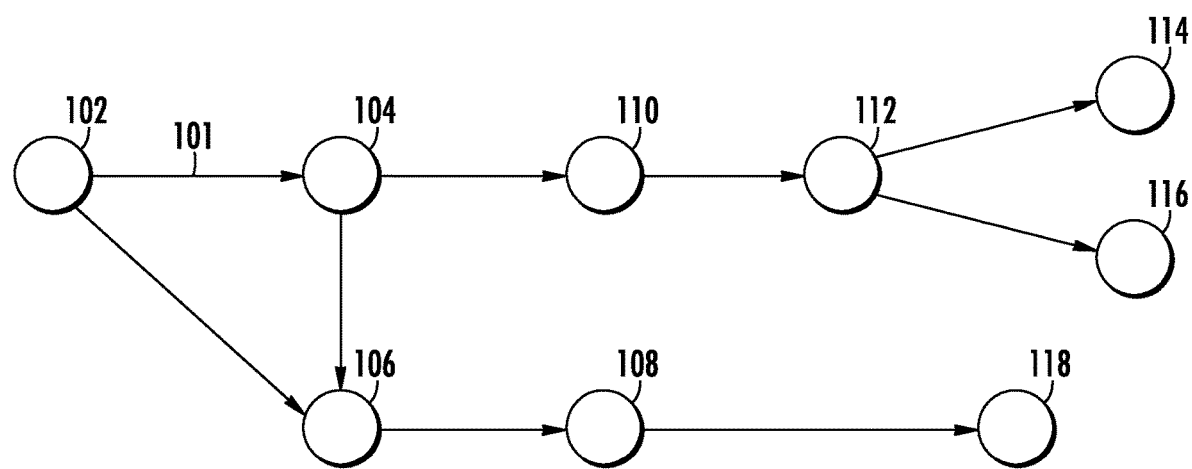
FIG. 1 depicts an example search graph according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods to determine a static memory allocation for a computing task represented by a graph of operators. For instance, the graph of operators may be associated with various suitable types of neural networks, such as for instance, convolutional neural networks, long short-term memory neural networks, etc. In particular, the systems and methods of the present disclosure can determine an execution order for a neural network that satisfies various memory constraints associated with execution of the neural network within a constrained memory space. The systems and methods of the present disclosure can also provide a roster of memory addresses to which input data, output data, and temporary execution data can be stored during execution of the neural network to satisfy the various memory constraints. Further, although aspects of the present disclosure will be discussed below with reference to a convolutional neural network for the purpose of explanation, the systems and methods of the present disclosure are equally applicable to other forms of neural networks or other computing tasks that include a plurality of interconnected operators.

In one example application of aspects of the present disclosure, data describing a graph of a convolutional neural network and data indicative of an amount of available memory in a constrained memory space can be obtained. The convolutional neural network can include an interconnected plurality of operators and the graph can describe such plurality of operators and their associated respective dependencies. An order of execution for the plurality of operators can be determined based at least in part on the amount of available memory in the constrained memory space. For instance, the order of execution can be determined to minimize or reduce the peak memory consumption required to execute the convolutional network. In particular, the systems and methods of the present disclosure can perform one or more graph search algorithms (e.g., shortest path algorithms which have peak memory consumption as their key metric) to determine the execution order. The present disclosure further provides various speed-up techniques which enable efficient operation of the one or more graph search algorithms.

More particularly, the data indicative of the convolutional neural network can include a graph (e.g. a directed acyclic graph or other graph) describing one or more connections (e.g. input/output dependencies) of the plurality of operators in the convolutional neural network. For instance, each operator in the convolutional neural network can consume input data and/or produce output data. In some implementations, the input data can include one or more input data buffers or input tensors, and the output data can include one or more output data buffers or output tensors. In particular, execution of an operator can produce output data. The output data can be determined based at least in part on the consumed input data. In example implementations, the output data can then be fed to one or more subsequent operators, such that the output data becomes input data for the one or more subsequent operators. In this manner, an operator cannot be executed until each of the operators providing input data required for the execution of the operator have been executed. The operators in the convolutional neural network can include convolutional operators, pooling operators, and/or various other suitable operators.

The constrained memory space can be any constrained memory space including, for instance, a static buffer on-chip with a processor configured to execute the convolutional neural network. Execution of each operator can require some amount of memory space. For instance, the amount of memory space required for execution of an operator can depend at least in part on the amount of input data consumed by the operator, the amount of output data produced by the operator, and/or an amount of temporary memory space required for execution of the operator. In addition, the amount of available memory space may be further constrained by output data of other operators that are still needed for execution of one or more subsequent operators that have yet to be executed.

According to example aspects of the present disclosure, an order of execution of the convolutional neural network can be determined based at least in part on the constrained memory space. In particular implementations, the order of execution can be determined to minimize or reduce a peak amount of memory required for execution of the convolutional neural network. For instance, in some implementations, a peak memory requirement can be determined for every possible order of execution of the convolutional neural network. In this manner, the order of execution having the lowest peak memory requirement can be selected.

In example implementations, the order of execution can be determined at least in part by performing one or more graph search algorithms. For example, the one or more graph search algorithms can include one or more shortest path algorithms, such as Dijkstra's algorithm, Floyd-Warshall algorithm, Johnson's algorithm, Viterbi algorithm, and/or various other suitable shortest path algorithms. The shortest path algorithms can use a peak memory usage of the execution order as their key metric.

In some implementations, each node in an additional search graph can correspond to a search state. Each node can have arcs extending therefrom which correspond to one or more candidate transitions from the corresponding search state. A transition from a first search state in the graph to a second search state in the graph, for instance, can include execution of one of the operators of the convolutional neural network. Thus, in some implementations, each transition between search states can be associated with execution of a particular operator that is currently executable. In particular, an operator can be currently executable if each instance of input data consumed by the operator is available for use by the operator.

More particularly, in some implementations, the search graph comprises a plurality of nodes and a plurality of arcs respectively that respectively connect the plurality of nodes. The plurality of nodes can respectively represent a plurality of search states. In some implementations, each search state can be defined by a set of operators corresponding to all of the operators that have been completed. Each search state can further be defined by the total peak memory consumption associated with the set of all operators that have been completed.

In some implementations, each search state can be defined by one or more smaller sets of "relevant" operators. For instance, in such implementations, each search state can be defined by a first set of operators and a second set of operators. The first set of operators can include operators that have been completed and which have at least one output that is required to be maintained for use by one or more subsequently executed operators. The second set of operators can include operators that have not been completed but for which all required inputs are available. The plurality of arcs can respectively represent candidate transitions between the plurality of search states, where transitioning from a search state includes performing one of the operators included in the second set of operators. Use of a smaller set of "relevant" operators in this fashion causes the search state to require less storage and enables faster processing.

In further implementations, the search states may be defined by additional information as well, including, for example, a current memory usage; a peak memory consumption in the past and present of such search state; a fingerprint of a parent search state; and an index of the last operator that was performed to transition from the parent search state to the present search state. Although certain of this additional information, such as current memory usage, could be recomputed based on other information provided for each search state, storage of such additional information for each search state eliminates the need to perform such recomputations. Furthermore, including "backtrack" information for the search state such as fingerprint of the parent state and the index of the last operator that was performed, enables the recursive backtrack and building of a full, reverse sequence of operations that led to a given search state. More particularly, when a "final" search state is reached that corresponds to the completion of all operators, such recursive backtrack can result in a full, reverse sequence of operations which can then be inverted to obtain the desired execution order for future execution of the neural network.

In example implementations, for each search state, the one or more candidate transitions can be analyzed to determine the subsequent operator to be executed. For instance, one of the candidate transitions can be selected and added to the order of execution. A candidate transition can be selected based at least in part on the memory requirements associated with execution of the operator corresponding to the candidate transition. For instance, a candidate transition can be selected by comparing the memory requirements of each candidate transition, and selecting the candidate transition requiring the least amount of memory space.

In some implementations, the order of execution can be determined based at least in part on one or more forced transitions. In some implementations, a forced transition can be a transition from a first search state to a second search state, where execution of the associated transitional operator does not increase the peak amount of required memory, and further does not increase an amount of currently required memory. In such implementations, when a forced transition is identified, one or more other candidate transitions from the first search state can be eliminated or otherwise pruned from the search space such that the one or more eliminated candidate transitions are no longer considered by the graph search algorithm in determining the order of execution. In this manner, the computational time associated with performance of the graph search algorithm can be significantly reduced.

As another example, in some implementations, the systems and methods of the present disclosure can determine a fingerprint for each explored search state. The fingerprint for each explored search state can be the result of the application of a hash function to the fields of the explored search state that uniquely identify the sets of operators that have been performed or completed. In some implementations, as noted above, the fingerprint of a parent search state and the index of the last operator performed can be used to recursively backtrack and build the full, reverse sequence of operations that led to a given search state. In this manner, once the "final" search state (e.g. the search state corresponding to the final operator to be executed) is reached, a full sequence of operations that led to the final search state can be determined. Further, the systems and methods of the present disclosure can detect when two or more explored search states have equivalent fingerprints, and in response to detection of two or more explored search states with equivalent fingerprints, select one of the two or more explored search states with equivalent fingerprints based on a comparison of the respective memory requirements of the two or more explored search states with equivalent fingerprints. Thus, in some implementations, only the "best" of two equivalent search states is maintained in a dictionary that maps fingerprints to best search states.

As yet another example, in some implementations, the search graph that is representative of the convolutional neural network can be traversed on an operator-by-operator basis, and the required memory for execution of each operator can be monitored or otherwise tracked (e.g., by simulating execution of the operator). When a forced transition is identified, the forced transition can be added to the order of execution.

According to another aspect of the present disclosure, a memory allocation of the constrained memory space associated with execution of each operator in the convolutional neural network can further be determined. For instance, the memory allocation can be a static memory allocation determined prior to execution of the convolutional neural network. In this manner, one or more memory addresses can be assigned to the output data produced in the convolutional neural network. The memory allocation can be determined based at least in part on the determined order of execution. For instance, the memory allocation can be determined such that data is stored in and/or freed from the constrained memory space in accordance with execution of the convolutional neural network in the determined order of execution.

In particular, each operator may be assigned one or more memory addresses within the constrained memory space. For instance, each operator may be assigned an output address where the output data produced by execution of the operator may be stored. The memory addresses may be represented as an annotation specifying the memory address. In addition, one or more operators may require a temporary memory space, such as a temporary buffer, for execution. A temporary data memory address can further be assigned as needed. As indicated above, an operator in the convolutional network may produce output data that becomes input data for one or more subsequently executed operators. In this manner, each instance of input data required for execution of the one or more subsequently executed operators in the convolutional network can remain in the constrained memory space until each of the one or more subsequently executed operators has been executed. When each of the one or more subsequently executed operators has been executed, the input data can be freed from the constrained memory space. In this manner, subsequent data can replace the freed data in accordance with example implementations of the present disclosure.

In example implementations, the convolutional neural network can be modified or edited based at least in part on the memory allocation. For instance, one or more additional operators can be added to the convolutional neural network based at least in part on the memory allocation. The one or more additional operators may be configured to improve the efficiency of the use of the constrained memory space in relation to execution of the convolutional neural network. For instance, the one or more additional operators may include defragment operators, move operators, reorder operators, and/or various other suitable operators associated with the allocation of memory in the constrained memory space. The additional operators may be inserted into the convolutional neural network as is desirable based at least in part on the constrained memory space and the determined order of execution.

Once determined, data indicative of the order of execution of the convolutional neural network and/or the memory allocation associated with the execution of the convolutional neural network can be stored for use in a future execution of the convolutional neural network. In one example, such data can then be provided to a remote computing device configured to execute the convolutional neural network. For instance, the remote computing device can be a wearable image capture device configured to execute the convolutional neural network.

In further implementations of the present disclosure, the graph search techniques of the present disclosure can be accelerated by identifying a series or set of forced transitions. For example, in some instances, a particular search state may not have a candidate transition that is a forced transition. However, it may be possible to identify a set of several transitions from such search state that satisfy a set of criteria (e.g., a combination of all of the transitions within the set may be said to be "strictly good").

However, since the number of potential sets of transitions to consider grows exponentially, this acceleration technique may be used heuristically, so that only a small number of "good" transition set candidates are explored. As one example, for all pending outputs O for which all their respective dependent tasks are executable, the systems and methods of the present disclosure may particularly consider the set of transitions that perform all executable tasks depending on O.

According to another aspect of the present disclosure, the graph search techniques described herein can be further accelerated by relaxing or otherwise generalizing the constraints or criteria associated with identification of forced transitions. Thus, instead of requiring the search algorithms to return an "optimal" answer, a "seemingly good" solution may instead be acceptable. Stated differently, although relaxing the criteria associated with identification of forced transitions may return a result that is not strictly optimal, it will result in identification of a larger number of forced transitions, thereby considerably reducing the amount of time required to perform the search.

With reference now to the FIGS., example embodiments of the present disclosure will be discussed in further detail. For instance, FIG. 1 depicts an example search graph 100 according to example embodiments of the present disclosure. In particular, search graph 100 is a directed acyclic graph having a plurality of interconnected operators 102-118. It will be appreciated that various other suitable graphs can be used. Search graph 100 can be a serial graph wherein operators are executed one at a time, or a parallel graph wherein multiple operators can be executed simultaneously. Search graph 100 is provided as one simplified example to assist in explaining certain aspects of the present disclosure. The systems and methods of the present disclosure are applicable to search graphs that are significantly more complex than search graph 100.

Search graph 100 can correspond to a neural network, such as a convolutional neural network or a long short-term memory network, or graph 100 may correspond to various other networks of interconnected operators. Each node (e.g., nodes 102, 104, 106, 108, 110, 112, 114, 116, and 118) can correspond to an operator of the convolutional neural network. The connections (e.g. arrows) associated with the plurality of operators are indicative of one or more input/output dependencies of the plurality of operators. For instance, connection 101 represents that operator 104 requires the output of operator 102 for execution of operator 104. In this manner, operator 104 cannot be executed until operator 102 is executed.

In example implementations, a search algorithm can be performed on search graph 100 to determine an order of execution of search graph 100. The order of execution can be determined based at least in part on an amount of available memory in a constrained memory space associated with execution of search graph 100. For instance, the order of execution can be determined to minimize or reduce a peak memory consumption required for execution of search graph 100. In particular, the order of execution can be determined at least in part using a graph search algorithm having peak memory as a key metric. For instance, the graph search algorithm can be a shortest path algorithm, such as the Dijkstra algorithm or other shortest path algorithm.

As indicated above, in example implementations, the execution order can be determined by traversing every possible order of execution and selecting a desired order of execution (e.g. the order of execution having the lowest peak memory requirements).

In some implementations, the order of execution can be determined by analyzing (e.g., performing a graph search algorithm with respect to) an additional graph with nodes that correspond to one or more search states and arcs that correspond to candidate transitions between respective search states. As indicated, a search state can be defined based at least in part on a first and a second set of operators. For instance, the first set of operators can include one or more operators that have been executed but the output of which is required to be maintained (e.g. due to a subsequent operator requiring the output for execution). The second set of operators can include one or more operators that have not been executed but are currently executable (e.g. all of their required inputs are available). In such embodiments, each search state can have one or more candidate transitions corresponding to the execution of a currently executable operator. For instance, one example search state can be defined at least in part by completed operators 102 and 104 and currently executable operators 106 and 110. In this manner, the example search state can have two candidate transitions associated with the respective execution of currently executable operators 106 and 110. For instance, each candidate transition can then be analyzed and one of the candidate transitions can be selected and added to the order of execution. For instance, a candidate transition can be selected based at least in part on an amount of memory required for execution of the operator associated with the transition. Once a transition is selected, a new search state can then be determined based at least in part on the selected transition.

In alternative implementations, one or more forced transitions associated with a search state can be determined. A forced transition can be a transition where execution of the operator associated with such transition does not increase an amount of peak memory consumption and does not increase an amount of currently required memory. Once a forced transition is determined or otherwise identified, the forced transition can be added to the order of execution. In this manner, one or more other candidate transitions associated with the search state can be eliminated from consideration in determining the order of execution (e.g., pruned from the search space). For instance, in continuing the example regarding the search state corresponding to the output of operator 104, if the candidate transition associated with the execution of operator 106 is determined to be a forced transition, the forced transition can be added to the order of execution and the candidate transition associated with the execution of operator 110 can be eliminated from consideration or otherwise pruned from the search space. In this manner, the forced transition can be added to the order of execution without analyzing the candidate transition associated with the execution of operator 110. In some embodiments, the candidate transitions can be analyzed in a deterministic order such that a deterministic transition is selected in the event that a search state has multiple forced transitions.

In some implementations, a forced transition set associated with a search state can be determined. For instance, a forced transition set can be a set of multiple, sequential transitions from the search state to a set of additional search states, wherein the set of transitions does not increase peak memory consumption and does not increase a current memory consumption. In some implementations, the forced transition set can be determined by analyzing each candidate transition to determine a forced transition set. In this manner, although one individual transition may increase peak and/or current memory consumption, the forced transition set as a whole does not. In such embodiments, the forced transition set may be added to the order of execution.

In some implementations, a search state can be further defined by an amount of currently required memory, a peak amount of memory used in the past and present of the search state, the index of the last operator that was executed, and/or a fingerprint of the parent search state.

The fingerprint of a search state can be the result of application of a hash function to one or more parameters that define the search state. For example, the fingerprint for each search state can be the result of the application of the hash function to the fields of the explored search state that uniquely identify the set of operators that have been performed or completed. In some implementations, one or more search states can be equivalent. Equivalent search states can be determined at least in part from the fingerprint of the search states. As indicated above, when equivalent search states are identified, one of the equivalent search states can be selected and maintained in a dictionary mapping "best" search states to fingerprints.

Figure 2:
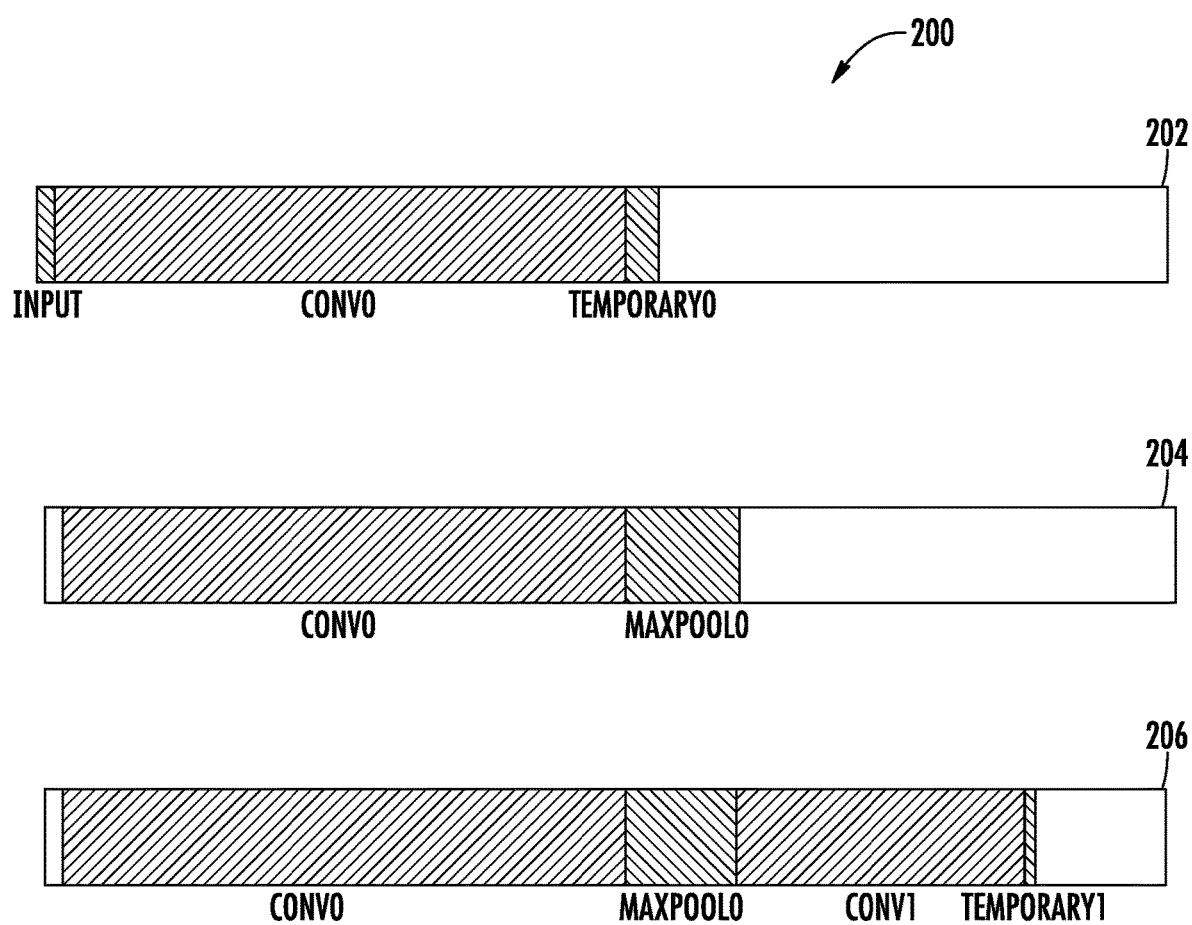
FIG. 2 depicts an example memory allocation associated with execution of a search graph according to example embodiments of the present disclosure.

As indicated above, memory associated with execution of search graph 100 can further be statically allocated, for instance, in conjunction with determining the order of execution of search graph 100 (e.g. prior to the execution of the convolutional neural network represented by search graph 100). For instance, FIG. 2 depicts an example memory allocation scheme 200 associated with execution of a search graph according to example embodiments of the present disclosure. In particular, FIG. 2 depicts a memory allocation of a constrained memory space associated with the execution of operators 102, 104, and 106, in that order.

Memory allocation 202 depicts data buffers or tensors associated with input data, output data (conv0), and temporary data (temprary0) for operator 102. More particularly, operator 102 can be a convolutional operator that consumes input data and produces output data (conv0) based at least in part on the input data. Execution of operator 102 can further require temporary data (temporary0).

When determining the order of operation of search graph 100, one or more memory locations or addresses can be determined for the data required for execution of each operator. In this manner, memory allocation for each operator can be determined based at least in part on the determined order of execution. For instance, memory allocation 202 can include memory locations for the input data, the output data, and the temporary data. The memory allocation 202 can be annotated to operator 102 within the execution order, so that the executing device is provided with the addresses indicated by allocation 202 when operator 102 is performed.

As indicated above, when an operator is executed, the input data required for execution of that operator may be freed from the memory space (e.g. so long as no other yet to be executed operator requires the same input data for execution). For instance, memory allocation 204 depicts the memory allocation associated with the execution of operator 104. As shown, the input data of memory allocation 202 has been freed, and the memory which previously stored the input data of memory allocation 202 is available, but not actively allocated for data storage by allocation 204. As the output data of operator 102 is required as an input for execution of operator 104 (as evidenced by connection 101 of FIG. 1), the conv0 data remains allocated within the constrained memory space. In addition, the temporary data associated with operator 102 can be freed. As shown, a portion of the output data (e.g. maxpool0) associated with operator 104 has been allocated to the location where the temporary0 data was previously allocated.

Memory allocation 206 is associated with the execution of operator 106. As shown in FIG. 1, execution of operator 106 requires inputs from operators 102 and 104. In this manner, conv0 data of operator 102 and maxpool0 data of operator 104 are maintained in the constrained memory space for use by operator 106. Execution of operator 106 produces output data (conv1) and requires temporary data (temporary1). After performance of operator 106, the output data from operator 102 (e.g., conv0) can be freed, as it is not required as input for any further operators.

In example embodiments, search graph 100 and/or the associated execution order can be edited to add additional operators. For instance, the additional operators can include operators associated with memory allocation. In particular, the additional operators can include defragment operators, move operators, reorder operators and various other suitable operators. Such additional operators can be added to the graph based at least in part on the constrained memory space. For instance, one or more additional operators may be added in various positions in search graph 100 to increase an amount of contiguous memory space. In this manner, efficiency of the memory allocation may be improved.

As an example, neural networks often have a couple of relatively large sets of input/output data (e.g., input/output tensors) that need to be maintained for future operators in addition to a number of smaller sets of input/output data. In a constrained memory space, such scenario results in an undesirable amount of fragmentation, a situation where there is enough free memory, but it is broken up into pieces that are each too small. Therefore, inclusion of a defragmentation operator as described herein can eliminate or otherwise reduce such fragmentation to enable execution of the neural network. In some implementations, a defragmentation operator can be added to the order of execution at each instance in which it is required to enable performance of the next desired operator. For example, at each transition between search states or operators, it can be determined whether addition of a defragmentation operator is required to enable performance of the next desired operator.

With general reference to visual representations of memory included in FIG. 2, one example defragmentation operator can include move instructions for moving (e.g., by memory-to-memory copying) each block of data as far possible to the left-hand side of the representation, starting with the left most block of data.

Figure 3:
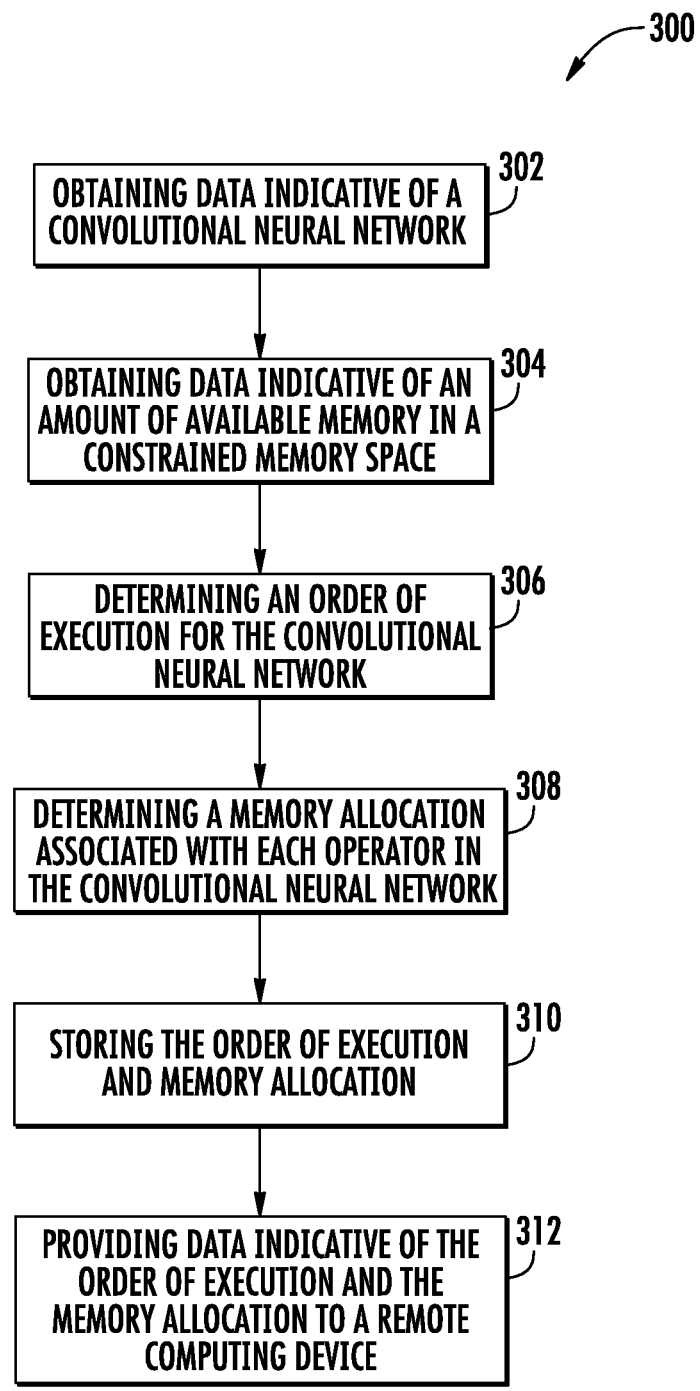
FIG. 3 depicts a flow diagram of an example method of determining an order of execution associated with a search graph according to example embodiments of the present disclosure.

FIG. 3 depicts a flow diagram of an example method (300) of determining an order of execution associated with a search graph according to example embodiments of the present disclosure. Method (300) can be implemented by one or more computing devices, such as one or more of the computing devices depicted in FIG. 6. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) includes obtaining data indicative of a search graph. The search graph may correspond to a graph of a convolutional neural network or other network having a plurality of interconnected operators. For instance, the operators may consume one or more input buffers and output one or more output buffers. The output buffers may be determined based at least in part on the input buffers. An output buffer produced by an operator may then be fed forward and become an input buffer for one or more subsequent operators.

In some implementations, the data obtained at (302) can be indicative of a directed acyclic graph that includes nodes representative of operators and arcs representative of input/output dependencies between operators. In some of such implementations, the method (300) can further include building an additional search graph based on the directed acyclic graph. For example, the additional search graph can have nodes that are representative of search states and arcs that are representative of candidate transitions between respective search states. In other implementations, the data obtained at (302) can be indicative of the additional search graph with the nodes that are representative of search states.

At (304), method (300) can include obtaining data indicative of an amount of available memory in a constrained memory space. For instance, the constrained memory space may be any constrained memory space including, for instance, a static buffer on-chip with a processor configured to execute the convolutional neural network. The constrained memory space may be configured to store data associated with execution of the convolutional neural network.

At (306), method (300) can include determining an order of execution of the search graph (e.g. convolutional neural network). In some implementations, the order of execution can be determined such that the peak memory consumption associated with execution of the search graph does not exceed the amount of memory in the constrained memory space. For instance, when the peak memory exceeds the amount of memory in the constrained memory space, an error can be determined indicating that the available memory has been exceeded.

In further implementations, the order of execution can be determined to reduce or minimize the peak memory consumption associated with execution of the search graph. For instance, in some implementations, each possible order of execution can be traversed to determine peak memory consumption of each order of execution. The order of execution having the lowest peak memory consumption can be selected.

In other implementations, the order of execution can be determined by analyzing one or more search states. As described above, each search state can be defined by a set of operators corresponding to all of the operators that have been completed. Each search state can further be defined by the total peak memory consumption associated with the set of all operators that have been completed.

In some implementations, each search state can be defined by one or more smaller sets of "relevant" operators. For instance, in such implementations, each search state can be defined at least in part by a first set of operators corresponding to one or more operators that have been executed but have outputs that are required to be maintained in the memory space. The search state can further be defined at least in part by a second set of operators corresponding to one or more operators that have yet to be executed but are currently executable.

Figure 4:
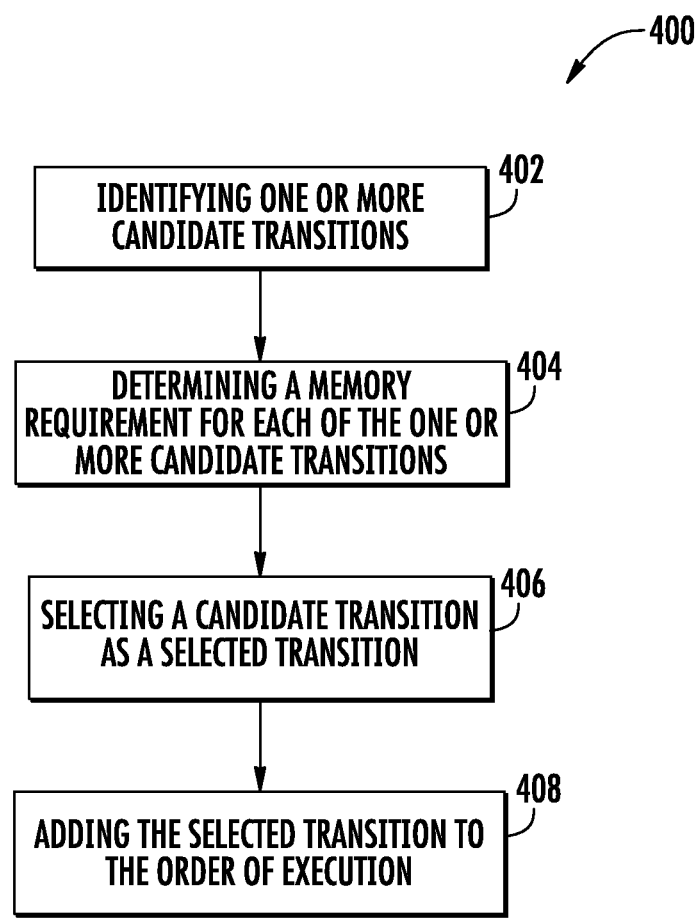
FIG. 4 depicts a flow diagram of an example method of determining an order of execution associated with a search graph using one or more candidate transitions according to example embodiments of the present disclosure.
Figure 5:
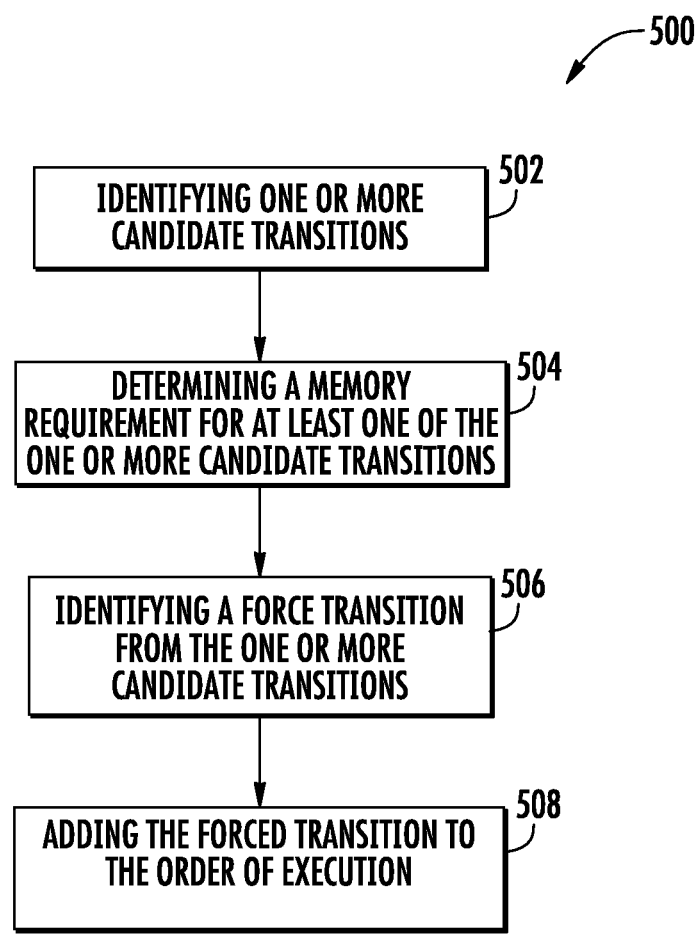
FIG. 5 depicts a flow diagram of an example method of determining an order of execution associated with a search graph using one or more forced transitions according to example embodiments of the present disclosure.

As will be described in more detail with respect to FIGS. 4 and 5, one or more candidate transitions can be determined from one or more search states. The order of execution can be determined based at least in part on memory consumption requirements associated with the candidate transitions.

At (308), method (300) can include determining a memory allocation associated with each operator in the search graph. The memory allocation can be determined based at least in part on the determined order of execution. In this manner, the memory allocation can be determined based at least in part on an amount of memory space that will be available in the constrained memory space during execution of each operator in accordance with the order of execution. In some implementations, the memory allocation can be determined in conjunction with the determination of the order of execution. The memory allocation can specify one or more memory locations in the constrained memory space in which to store data associated with execution of the operators.

The memory allocation may further include modifying or editing the graph and/or execution order to include one or more additional operators in accordance with memory space requirements in the constrained memory space. As indicated above, such additional operators can include defragmentation operators, move operators, reorder operators, etc.

At (310), method (300) can include storing the order of execution and the memory allocation for a future execution of the convolutional neural network. At (312), method (300) can include providing data indicative of the order of execution and/or memory allocation to a remote computing device configured to execute the convolutional neural network. For instance, the remote computing device may be a user device, such as a smartphone, tablet, laptop computer, desktop computer, wearable computing device, etc. Upon receiving the data indicative of the order of execution and/or memory allocation, the remote computing device can execute the convolutional neural network in accordance with the order of execution and memory allocation.

As indicated above, the order of execution may be determined by analyzing one or more candidate transitions. For instance, FIG. 4 depicts a flow diagram of an example method (400) of determining an order of execution for a neural network according to example embodiments of the present disclosure. At (402), method (400) can include identifying one or more candidate transitions. A candidate transition may correspond to a potential execution of a currently executable operator. In some embodiments, the one or more candidate transitions can be associated with a search state. In this manner, the candidate transitions can each correspond to a potential transition from such search state to a new search state (e.g., through performance of a particular operator).

At (404), method (400) can include determining a memory requirement associated with each candidate transition. In particular, the memory requirement associated with a candidate transition can specify an amount of memory space that will be used if the operator associated with the candidate transition is executed. In this manner, each candidate transition from the search state can be analyzed to determine the memory requirements of each candidate transition.

In some implementations, determining the memory requirement associated with each candidate transition at (404) can further include, for each candidate transition, determining whether addition of a defragmentation operator would be required to enable performance of such candidate transition (e.g., required to enable performance of the particular operator associated with such candidate transition). If a defragmentation operator would be required, then such defragmentation operator can be added to the search graph and/or the order of execution if such candidate transition is ultimately selected at (406).

At (406), method (400) can include selecting a candidate transition as a selected transition. A candidate transition can be selected based at least in part on the determined memory requirements associated with each candidate transition. In some implementations, the selected transition can be the candidate transition having the lowest memory requirement. In other implementations, the selected transition can be selected based various other desired memory characteristics.

At (408), method (400) can include adding the selected transition to the order of execution. In this manner, the order of execution of the search graph can be determined on an operator-by operator basis based at least in part on the one or more candidate transitions. For instance, after the selected transition is added to the order of execution, a new search state can be determined that includes the output of the operator associated with the selected transition.

In some embodiments, the order of execution of the search graph can be determined based at least in part on one or more forced transitions. For instance, FIG. 5 depicts a flow diagram of an example method (500) of determining an order of execution of a search graph according to example embodiments of the present disclosure. At (502), method (500) can include identifying one or more candidate transitions. For instance, as described above, the candidate transitions can be associated with a search state.

At (504), method (500) can include determining a memory requirement for at least one of the candidate transitions. At (506), method (500) can include identifying a forced transition. As indicated above, a forced transition can be a transition from a search state that does not increase a peak amount of memory consumption and/or a current amount of memory consumption. In some implementations, the candidate transitions can be analyzed until one of the candidate transitions is identified as a forced transition.

At (508), method (500) can include adding the forced transition to the order of execution. For instance, the forced transition can be added to the order of execution in response to identifying the forced transition. In this manner, once the forced transition is identified, the forced transition can be added to the order of execution without having to analyze the candidate transitions associated with the search state that have yet to be analyzed. This can save computational time and resources associated with determining the order of execution.

Figure 6:
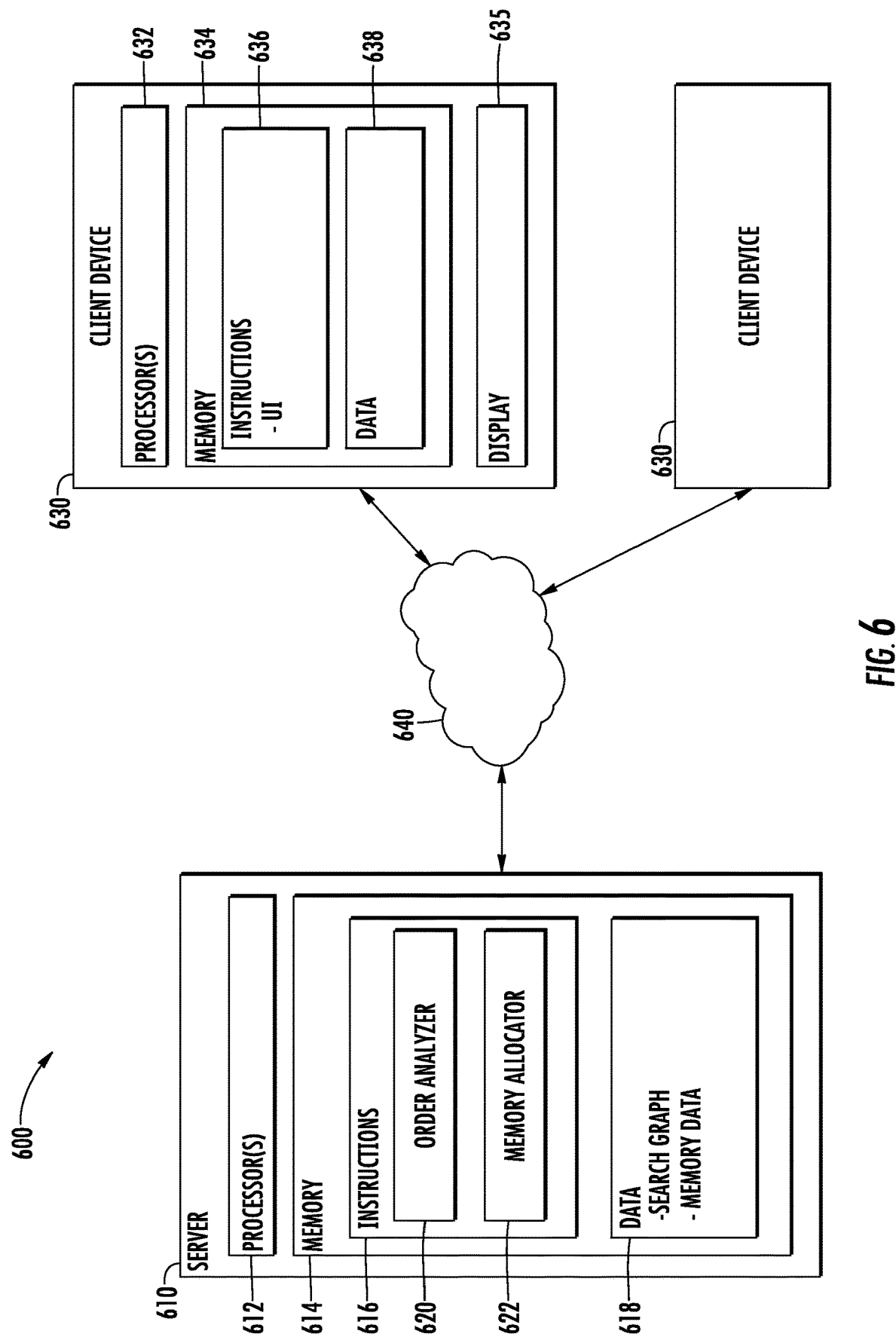
FIG. 6 depicts an example system according to example embodiments of the present disclosure.

FIG. 6 depicts an example computing system 600 that can be used to implement the methods and systems according to example aspects of the present disclosure. The system 600 can be implemented using a client-server architecture that includes a server 610 that communicates with one or more client devices 630 over a network 640. It will be appreciated that the system 600 can be implemented using other suitable architectures, such as a single computing device.

The system 600 includes a server 610, such as a web server. The server 610 can host a static analyzer configured to determine an order of execution for a convolutional neural network according to the techniques discussed herein. The server 610 can be implemented using any suitable computing device(s). The server 610 can have one or more processors 612 and one or more memory devices 614. The server 610 can also include a network interface used to communicate with one or more client devices 630 over the network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, or other suitable processing device. The one or more memory devices 614 can include one or more computer-readable media, including, but not limited to, non-transitory computer-readable media, RAM, ROM, hard drives, flash drives, or other memory devices. The one or more memory devices 614 can store information accessible by the one or more processors 612, including computer-readable instructions 616 that can be executed by the one or more processors 612. The instructions 616 can be any set of instructions that when executed by the one or more processors 612, cause the one or more processors 612 to perform operations. For instance, the instructions 616 can be executed by the one or more processors 612 to implement an order analyzer 620 and a memory allocator 622. For instance, order analyzer 620 can be configured to determine an order of execution associated with a search graph according to example embodiments of the present disclosure. Memory allocator 622 can be configured to determine a memory allocation within a constrained memory space associated with execution of the search graph.

As shown in FIG. 6, the one or more memory devices 614 can also store data 616 that can be retrieved, manipulated, created, or stored by the one or more processors 612. The data 616 can include, for instance, search graph data, memory data, and other data. The data 616 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. In some embodiments, the server 610 can exchange data with the one or more client devices 630 directly, for instance, via a wired connection. Although two client devices 630 are illustrated in FIG. 6, any number of client devices 630 can be connected to the server 610 over the network 640. Each of the client devices 630 can be any suitable type of computing device, such as a general purpose computer, special purpose computer, laptop, desktop, mobile device, navigation system, smartphone, tablet, wearable computing device, wearable image capture device, a display with one or more processors, or other suitable computing device.

Similar to the server 610, a client device 630 can include one or more processor(s) 632 and a memory 634. The one or more processor(s) 632 can include one or more central processing units (CPUs), graphics processing units (GPUs) dedicated to efficiently rendering images or performing other specialized calculations, and/or other processing devices. The memory 634 can include one or more computer-readable media and can store information accessible by the one or more processors 632, including instructions 636 that can be executed by the one or more processors 632 and data 638.

For instance, the memory 634 can store instructions 636 for executing a convolutional neural network. In particular, the server 610 can provide the client device 630 with instructions 636 that include the order of execution for a convolutional neural network and one or more memory allocations that provide memory addresses for input, outputs, and/or temporary buffers for each operator in the order of execution. The client device 630 can implement the convolutional neural network in accordance with the order of execution and the one or more memory allocations.

The client device 630 of FIG. 6 can include various input/output devices for providing and receiving information from a user, such as a touch screen, touch pad, data entry keys, speakers, and/or a microphone suitable for voice recognition. For instance, the client device 630 can have a display device 635 for presenting a user interface displaying semantic place names according to example aspects of the present disclosure.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

In particular, although the systems and methods of the present disclosure have been described with reference to static allocation and execution orders for convolutional neural networks, the present disclosure is equally applicable to and useful for other forms of neural networks or other multi-layer models. In particular, aspects of the present disclosure can be applied to a graph that is representative of any computational process that includes a plurality of interconnected operators having various input, output, and temporary buffer memory requirements.

What is claimed is:

1. A computer-implemented method of determining an order of execution of a neural network, the method comprising:

obtaining, by one or more computing devices, data that describes a graph of a neural network, the neural network comprising a plurality of operators;

obtaining, by the one or more computing devices, data indicative of an amount of available memory in a constrained memory space; and performing, by the one or more computing devices, at least one graph search algorithm on the graph to determine an order of execution associated with the neural network, the order of execution specifying an order in which to execute each of the plurality of operators, wherein the order of execution results in a memory usage that does not exceed the amount of available memory in the constrained memory space;

wherein performing, by the one or more computing devices, the at least one graph search algorithm comprises:

identifying, by the one or more computing devices, one or more forced transitions indicative of a transition between a first operator and a second operator such that the peak memory consumption associated with execution of the neural network does not increase;

adding, by the one or more computing devices, the one or more forced transitions to the order of execution; and pruning, by the one or more computing devices, a search of a portion of the graph based at least in part on the identified one or more forced transitions.

2. The computer-implemented method of claim 1, further comprising:

determining, by the one or more computing devices, a first memory address for each operator of the plurality of operators, each first memory address specifying a location in the constrained memory space in which to store output data of the corresponding operator; and determining, by the one or more computing devices, a second memory address for at least one operator of the plurality of operators, each second memory address specifying a location in in the constrained memory space in which to store temporary data associated with execution of the corresponding operator.

3. The computer-implemented method of claim 2, wherein the first memory address and the second memory address are determined based at least in part on the determined order of execution of the neural network.

4. The computer-implemented method of claim 1, wherein performing, by the one or more computing devices, the at least one graph search algorithm comprises:

identifying, by the one or more computing devices, one or more candidate orders of execution of the neural network;

determining, by the one or more computing devices, a memory requirement associated with execution of the neural network in accordance with each candidate order of execution; and selecting, by the one or more computing devices, the determined order of execution based at least in part on the determined memory requirements.

5. The computer-implemented method of claim 1, wherein the order of execution of the neural network is determined at least in part using a shortest path algorithm that uses an all time peak memory usage as its key metric.

6. The computer-implemented method of claim 1, wherein performing, by the one or more computing devices, the at least one graph search algorithm comprises adding, by the one or more computing devices, one or more additional operators to the neural network.

7. The computer-implemented method of claim 6, wherein adding, by the one or more computing devices, the one or more additional operators comprise adding, by the one or more computing devices, at least one of a defragment operator, a move operator, or a reorder operator associated with the constrained memory space.

8. The computer-implemented method of claim 1, wherein the constrained memory space comprises a scratch buffer that is on-chip with a processor configured to execute the neural network.

9. The computer-implemented method of claim 1, further comprising determining, by the one or more computing devices, an error when an amount of data required for execution of one or more operators exceeds the amount of available memory in the constrained memory space.

10. The computer-implemented method of claim 1, further comprising storing, by the one or more computing devices, the determined order of execution, such that a future execution of the neural network occurs in accordance with the stored order of execution.

11. The computer-implemented method of claim 1, further comprising providing, by the one or more computing devices, the determined order of execution to a wearable image capture device configured to execute the neural network.

12. A computing system to determine a static allocation of a neural network, the computing system comprising at least one processor and at least one non-transitory computer-readable medium storing instructions executable by the at least one processor to cause the computing system to:

obtain data that describes a graph of a neural network, wherein the neural network comprises a plurality of operators;

obtain data that describes an amount of available memory in a constrained memory space;

perform at least one graph search algorithm on the graph to determine an execution order for the plurality of operators of the neural network that results in memory usage that does not exceed the amount of available memory in the constrained memory space; and store the determined execution order, wherein future execution of the neural network occurs according to the stored execution order;

wherein to perform the at least one graph search algorithm, the computing system:

identifies one or more forced transitions indicative of a transition between a first operator and a second operator such that the peak memory consumption associated with the execution of the neural network does not increase;

adds the one or more forced transitions to the execution order; and prunes a search of a portion of the graph based at least in part on the identified one or more forced transitions.

13. The computing system of claim 12, wherein to identify the one or more forced transitions, the computing system:

identifies that the one or more forced transitions necessarily decrease one or more memory requirements of the execution order.

14. The computing system of claim 12, wherein:

the graph comprises a plurality of nodes and a plurality of arcs respectively that respectively connect the plurality of nodes;

the plurality of nodes respectively represent a plurality of search states, each search state comprising a first set of operators and a second set of operators, the first set of operators comprising operators that have been completed and that have at least one output that is required to be maintained, the second set of operators comprising operators that have not been completed but for which all required inputs are available; and the plurality of arcs respectively represent candidate transitions between the plurality of search states.

15. The computing system of claim 14, wherein to perform the at least one graph search algorithm, the computing system:

analyzes, for a given node, at least one of a plurality of available arcs for such node to determine whether such arc represents a forced transition, wherein a forced transition does not increase a peak memory used, and wherein a forced transition does not increase a current memory used; and in response to a determination that one of the available arcs represents a forced transition:

selects such available arc as the transition for the given node; and prunes the other available arcs from a search space of the graph.

16. The computing system of claim 12, wherein execution of the instructions further causes the computing system to:

provide at least one annotation for each of the plurality of operators of the neural network, wherein the at least one annotation for each of the plurality of operators comprises a first memory address and a second memory address, the first memory address describing a first memory location at which output data of the operator should be stored, the second memory address describing a second location at which a temporary buffer of the operator should be stored.

17. A computing system to determine a static allocation of a neural network, the computing system comprising at least one processor and at least one non-transitory computer-readable medium storing instructions executable by the at least one processor to cause the computing system to:
   obtain data that describes a graph of a neural network, wherein the neural network comprises a plurality of operators, the graph comprises a plurality of nodes and a plurality of arcs that respectively connect the plurality of nodes, the plurality of nodes respectively represent a plurality of search states, each search state comprising a first set of operators and a second set of operators, the first set of operators comprising operators that have been completed and that have at least one output that is required to be maintained, the second set of operators comprising operators that have not been completed but for which all required inputs are available, and the plurality of arcs respectively represent candidate transitions between the plurality of search states;
   obtain data that describes an amount of available memory in a constrained memory space;
   perform at least one graph search algorithm on the graph to determine an execution order for the plurality of operators of the neural network that results in memory usage that does not exceed the amount of available memory in the constrained memory space, wherein to perform the at least one graph search algorithm, the computing system:
      determines a fingerprint for each of a plurality of explored search states of the plurality of search states, wherein the fingerprint for each explored search state comprises a result of an application of a hash function to one or more fields of the explored search state that uniquely identify a third set of operators that have been completed; and
      detects when two or more explored search states have equivalent fingerprints; and
      in response to detection of two or more explored search states with equivalent fingerprints, selects one of the two or more explored search states with equivalent fingerprints based on a comparison of the respective memory requirements of the two or more explored search states with equivalent fingerprints; and
   store the determined execution order, wherein future execution of the neural network occurs according to the stored execution order.

18. A non-transitory computer-readable medium storing instructions that, when executed by at least one processor, cause the at least one processor to perform operations, the operations comprising:
   obtaining data indicative of a neural network, the neural network comprising a plurality of operators;
   obtaining data indicative of an amount of available memory in a constrained memory space;
   building a graph that describes a plurality of dependencies respectively between the plurality of operators of the neural network; and
   performing at least one graph search algorithm to determine an order of execution for the neural network, the order of execution specifying an order in which to execute each of the plurality of operators, the order of execution being determined based at least in part on the available memory in the constrained memory space;
   wherein performing at least one graph search algorithm comprises:
      identifying one or more forced transitions within the graph that necessarily decrease one or more memory requirements of the order of execution;
      adding at least one of the one or more forced transitions to the execution order; and
      pruning a search of a portion of the graph based at least in part on the identified one or more forced transitions.

19. The non-transitory computer-readable medium of claim 18, wherein the instructions which cause the at least one processor to perform the at least one graph search algorithm cause the at least one processor to perform at least one shortest path algorithm that uses a peak memory usage as a key metric.

* * * * *